(12) United States Patent
Munro et al.

(10) Patent No.: US 12,247,857 B2
(45) Date of Patent: Mar. 11, 2025

(54) FLOW MEASUREMENT APPARATUS AND METHOD OF USE

(71) Applicant: GM FLOW MEASUREMENT SERVICES LIMITED, Mintlaw (GB)

(72) Inventors: Gavin Munro, Mintlaw (GB); Victor Gawski, Mintlaw (GB)

(73) Assignee: GM Flow Measurement Services Limited, Mintlaw (GB)

( * ) Notice: Subject to any disclaimer, the term of this patent is extended or adjusted under 35 U.S.C. 154(b) by 0 days.

(21) Appl. No.: 17/253,767

(22) PCT Filed: Jun. 17, 2019

(86) PCT No.: PCT/GB2019/051682
§ 371 (c)(1),
(2) Date: Dec. 18, 2020

(87) PCT Pub. No.: WO2019/243789
PCT Pub. Date: Dec. 26, 2019

(65) Prior Publication Data
US 2021/0262842 A1    Aug. 26, 2021

(30) Foreign Application Priority Data
Jun. 18, 2018   (GB) ..................................... 1809991

(51) Int. Cl.
*G01F 1/40*   (2006.01)
(52) U.S. Cl.
CPC ..................................... *G01F 1/40* (2013.01)

(58) Field of Classification Search
CPC ..... G01F 1/40; G01F 1/36; G01F 1/38; G01F 1/42; G01F 1/44; G01F 5/005
See application file for complete search history.

(56) References Cited

U.S. PATENT DOCUMENTS

| | | | | |
|---|---|---|---|---|
| 550,805 A | * | 12/1895 | Stimpson | B21D 28/34 83/687 |
| 3,196,680 A | * | 7/1965 | Curran | G01F 1/44 73/861.52 |
| 3,904,259 A | * | 9/1975 | Hoffmann | G11B 23/023 220/323 |
| 5,814,738 A | | 9/1998 | Pinkerton et al. | |

(Continued)

FOREIGN PATENT DOCUMENTS

| | | | | |
|---|---|---|---|---|
| CA | 2151170 C | * | 5/2006 | ............... F15D 1/06 |
| CN | 106057331 A | * | 10/2016 | |

(Continued)

OTHER PUBLICATIONS

International Search Report and Written Opinion for PCT/GB2019/051682 dated Oct. 16, 2019.

*Primary Examiner* — Justin N Olamit
(74) *Attorney, Agent, or Firm* — FisherBroyles, LLP

(57) ABSTRACT

The invention provides a flow measurement apparatus which comprise a meter body comprising a through bore and a fluid flow path. The apparatus also comprises at least one pressure port configured to be in fluid communication with the fluid flow path, a flow displacement member and a mounting member. The flow displacement member and/or the mounting member are configured to be removably mountable within the through bore.

27 Claims, 5 Drawing Sheets

(56) References Cited

U.S. PATENT DOCUMENTS

| | | | | |
|---|---|---|---|---|
| 7,500,405 B2* | 3/2009 | Gongaware | ................ | G01F 1/40 |
| | | | | 73/861.52 |
| 7,992,453 B1* | 8/2011 | Lawrence | ................. | G01F 1/40 |
| | | | | 73/861.42 |
| 8,387,438 B2* | 3/2013 | Lawrence | ........... | G01F 25/0007 |
| | | | | 73/1.35 |
| 8,984,961 B2* | 3/2015 | Irani | ........................ | G01F 1/44 |
| | | | | 73/861.52 |
| 9,435,199 B1* | 9/2016 | Halilah | ................ | G01L 19/0092 |
| 9,625,294 B2* | 4/2017 | Schoohf | .................. | G01F 1/584 |
| 10,302,472 B1* | 5/2019 | Holmes | .................... | G01F 1/40 |
| 2008/0016946 A1* | 1/2008 | Thanigachalam | ......................... | |
| | | | | G01N 27/4077 |
| | | | | 73/31.05 |
| 2012/0180547 A1 | 7/2012 | Lawrence | | |
| 2013/0213142 A1 | 8/2013 | Irani et al. | | |
| 2014/0260657 A1 | 9/2014 | Strom et al. | | |
| 2016/0303527 A1 | 10/2016 | Hodges | | |
| 2019/0029378 A1* | 1/2019 | Lee | ...................... | A45B 25/143 |

FOREIGN PATENT DOCUMENTS

| | | |
|---|---|---|
| GB | 2146781 A | 4/1985 |
| WO | WO98/10249 A1 | 3/1998 |
| WO | WO2006/022702 A1 | 3/2006 |

* cited by examiner

FLOW MEASUREMENT APPARATUS AND METHOD OF USE

This application is the U.S. National Stage of International Application No. PCT/GB2019/051682, which was filed on Jun. 17, 2019. This application also claims the benefit of the filing date of GB patent application No. 1809991.1, which was filed on Jun. 18, 2018. The contents of both applications are hereby incorporated by reference.

FLOW MEASUREMENT APPARATUS AND METHOD OF USE

The present invention relates to a flow measurement apparatus, and particular to flow measurement apparatus used to measure fluid flow rates in oil and gas industry systems. Aspects of the invention relate to an apparatus for measuring a flow rate in a production flow stream and methods of installing, configuring and using the flow measurement apparatus.

BACKGROUND TO THE INVENTION

Industries such as the offshore oil and gas production industry recognise the considerable value in accurately monitoring fluid flow in production flow streams. Conventionally fluid flow meter devices are inserted into a production pipeline to monitor the flow rate of a fluid.

One particular type of flow meter is a differential pressure flow meter which relies on the Bernoulli principle. The Bernoulli principle states that an increase in the speed of a fluid occurs simultaneously with a decrease in the pressure of the fluid. These measurement devices measure the differential pressure induced in the fluid as it flows through a constriction or around an obstacle in the fluid conduit. The flow rate of the fluid may then be accurately determined from the pressure difference.

Differential pressure flow meters are designed and calibrated for a specific fluid type and have a predetermined flow rate range. However, due to restricted space in the pipework it is difficult and time consuming to install a flow meter in the correct orientation and configuration. If the meter is installed incorrectly it may lead to inaccurate flow measurements or in some cases the flow meter not measuring the flow rate at all.

During fluid production operations, the fluid flow rate may vary considerably and may be outside the predetermined range that the meter is capable of accurately measuring.

Unplanned interruptions to fluid production processes to replace the meter with a different measurement range may be dangerous to personnel and may damage infrastructure. The interruption to install and pressure check the new meter may result in significant production delays which can be costly.

Other considerations regarding reliability of flow meters is the condition of the flow meter with respect to wear, erosion, corrosion and damage caused by foreign objects, which may be present within the fluid flow.

Foreign objects may take the form of sand and hard formation particulates and loose rust particles originating from internal surfaces of production equipment and piping. Foreign objects of various size, shape, chemistry and mechanical characteristics may originate from failed or degraded production equipment which is positioned upstream of the meter. These objects may affect the accuracy of the meter.

SUMMARY OF THE INVENTION

It is an object of at least one aspect of the present invention to obviate or at least mitigate the foregoing disadvantages of prior art flow meters.

It is another object of an aspect of the present invention to provide a flow measurement apparatus with improved accuracy and/or efficiency which is robust, reliable and capable of being readily disassembled, or partially disassembled. This may facilitate the ease of installation, inspection and condition assessment of internal components and allow assembly and/or reconfiguration.

It is an object of an aspect of the present invention to provide a flow measurement apparatus capable of physically reconfiguring the flow displacement member to change the beta ratio such that the flow rate can be accurately measured over a range of flow rates.

It is a further aspect of the present invention to provide a flow measurement apparatus which is resistant to the effects of wear, erosion, corrosion and impact damage, caused by chemicals, particulates and foreign objects which may be present within the fluid flow.

It is another object of an aspect of the present invention to provide a method of installing and configuring a flow measurement apparatus.

Further aims and objects of the invention will become apparent from reading the following description According to a first aspect of the invention, there is provided a flow measurement apparatus comprising:
  a meter body comprising a through bore and a fluid flow path; and
  a flow displacement member removably mountable within the through bore.

By providing a removably mountable flow displacement member within the through bore, the flow displacement member may be installed and/or removed from the meter body quickly and the orientation of the flow displacement member may be adjusted within the confined inner space of the meter body to a preferred configuration or position.

The removable flow displacement member may facilitate the flow displacement member to be removed and/or inspected to assess for wear, erosion and damage. In use the flow displacement members are acted upon by the fluid flow, this may result in erosion, vibration and shock loading of the apparatus, which may lead to apparatus fatigue cracking and failure.

Preferably the flow displacement member is mounted and/or supported by a mounting member. The mounting member is configured to mount, support and/or position the flow displacement member in the through bore.

The flow measurement apparatus may comprise at least one pressure port configured to be in fluid communication with the fluid flow path.

The flow displacement member and/or the mounting member may be configured to be removably mountable within the through bore. The flow displacement member may be removably attached to the mounting member. Preferably the mounting member is a mounting stem. Preferably the mounting member and/or the flow displacement member is configured to be reversibly attachable to the meter body.

The mounting member and flow displacement member may be joined to each other using various methods including reversible mechanical fixings such as bolts or screws, chemical adhesive or welding. The mounting member and flow displacement member may be an integral unit.

The mounting member may be securely mounted to the meter body by mechanical connections, including threaded and/or tapered connections. The mounting member may be securely mounted to an inner surface of the through bore of the meter body. The tapered connection may be combined with a stepped shoulder. The stepped shoulder may be a generally circular, rectangular or other suitable shape. Secure location of the mounting member is critical to ensure robustness and reliability of the meter.

The tapered connection on the meter body and the mounting member may facilitate orientation of the combined mounting member and flow displacement member within the restricted confines of the through bore of the meter body. This may facilitate easy and rapid assembly and disassembly of the combined mounting member and flow displacement member.

The flow measurement apparatus may comprise at least one interlocking locating pin and corresponding grooves. The at least one interlocking locating pin may be located on the meter body with corresponding grooves on the mounting member.

The at least one interlocking locating pin may be located on the mounting member with corresponding grooves on the meter body. This may facilitate accurate alignment of the mounting member and the connected flow displacement member relative to the inner surface of the through bore or fluid flow path.

The flow measurement apparatus may comprise a vibration isolation mechanism. The vibration isolation mechanism may be incorporated into a connection between the mounting member and the meter body. The vibration isolation mechanism may be of metallic or polymer material, or a combination thereof.

The flow measurement apparatus may comprise at least one pressure port or outlet. The flow measurement apparatus may comprise a first pressure port or outlet and a second pressure port or outlet. The first pressure port or outlet may be configured to be in fluid communication with the fluid flow path at a position upstream of the flow displacement member.

The second pressure port or outlet may be configured to be in fluid communication with the fluid flow path at a position downstream of the flow displacement member.

The second pressure port or outlet may be configured to be in fluid communication with the fluid flow path at a position downstream of the flow displacement member via an interior passageway which extends through the mounting member and/or flow displacement member.

The flow measurement apparatus may be configured to be readily disassembled and the flow displacement member physically reconfigured to change the beta ratio of the meter such that the flow rate may be accurately measured.

The reconfiguration of the flow displacement member may include changing of the position and/or orientation of the flow displacement member in relation to the inner surface or diameter of the through bore of the meter body. The reconfiguration of the flow displacement member may include changing the physical shape and/or physical surface characteristics of the flow displacement member.

The flow displacement member and/or through bore may be accurately profiled and sized to provide a desired beta ratio between the flow displacement member and the bore, relative to a predetermined flow rate measurement range for the flow measurement apparatus.

The flow measurement apparatus may facilitate accurate measurement of a wide range of flow rates by the flow displacement member being readily and quickly removed, inspected, reconfigured and/or replaced. The fluid flow path between the flow displacement member and the meter body may be changed to create different flow areas and beta ratios for the meter. The beta ratio may be reliably set, and accurate flow rate measurement readings may be calculated Preferably the flow displacement member, typically of cone shaped geometry is configured to change the dimensions of the fluid flow path relative to the inner diameter or surface of the through bore of the meter body.

The through bore of the meter body may be of any cross sectional and longitudinal shape. The dimensions of the fluid flow path between the flow displacement member and inner surface of the through bore of the meter body may be adjusted to measure a range of flow rates. The dimensions of the fluid flow path between the flow displacement member and inner surface of the through bore of the meter body may be adjusted by changing the size, orientation and location of the displacement member.

The flow measurement apparatus may be capable of reconfiguration through the changing of the physical shape and/or physical surface characteristics of the flow displacement member.

The flow displacement member and/or meter body may comprise surface grooves or fluid pathways such as linear, helical and/or random grooves or pathways which allow for fine-tuning of the functioning of the meter.

The surface grooves may be formed by mechanical machining, electro-chemical machining, spark erosion, or during a casting or 3D printing manufacturing process. The flow displacement member may comprise fluid flow ports.

Surface and through-heat treatment may be applied to the meter bore, the mounting member and flow displacement member to provide functional benefits. The surfaces of the flow displacement member and or mounting member may be treated by laser surface modification processes to produce low friction, wear resistant and self-cleaning surfaces. These processes may include laser polishing, direct laser texturing and laser induced chemical transformations, such as laser surface hardening, are used to produce desired surface roughness and enhance erosion and wear resistance.

The inner surface of the through bore, the mounting member and/or the flow displacement member may comprise a coating.

The coating may be organic or inorganic and include carbide in a nickel-cobalt matrix, ceramics and polymers. The coating thickness may vary from nanometres to millimetres. The coatings may be applied using various methods including chemical vapour deposition, thermal spraying, slurry-coating and additive laser cladding.

Characteristics of the flow displacement member surface such as roughness and friction factor effects may be accounted for by applying relevant factors to mass flow rate and volume flow rate calculations.

The size or shape of the flow displacement member may be altered or adjusted prior to assembly with the meter body. The size or shape of the flow displacement member may be altered or adjusted while the flow displacement member is assembled within the meter body. Various methods may be used to achieve a size and/or shape change through intervention via ports and/or internal passageways in the mounting member and ports or cavities in the flow displacement member. The geometry of the internal passageways, ports and cavities may be dimensioned or optimised to accommodate the specific intervention type.

The flow measurement apparatus may comprise a gas pressure system, hydraulic pressure system, mechanical linkage, external intervention, electronic system and/or magnet system to adjust the size and/or shape of the flow displacement member.

The size and/or shape of the flow displacement member may be changed by gas or hydraulic pressure. The flow displacement member may be made of a polymer and the gas and hydraulic pressure may expand and/or contract the polymer.

The size and/or shape of the flow displacement member may be changed by a mechanical linkage or external intervention to expand and contract the flow displacement member and/or components of the flow displacement member.

The flow displacement member may be constructed from a number of segments or sections. The flow displacement member may be constructed from a number of interlocking segments or petals and a mechanical linkage or external intervention may be configured to expand and contract the dimensions of the flow displacement member.

Mechanical expansion or contraction of the flow displacement member or a component of the flow displacement member may be achieved through the application of torque and rotation and/or compressive or tensile loads.

Torque and rotation may be applied to the flow displacement member via shafts, gears, shafts, universal joints and/or via a flexible drive shaft. Compressive and tensile loads may be applied via shafts, universal joints and/or via a flexible drive shaft. Compressive and tensile loads may be converted to torque and rotation within the flow displacement member via gears or a worm drive.

The flow displacement member segments may be rotated or slid around or along a guide base or tapered mandrel. The flow displacement member segments may be in a contracted condition at a first position on the base or mandrel and in an extended condition at a second position on the base or mandrel.

The flow displacement member may comprise an electroactive polymer material. The flow measurement apparatus may include an electronic system to actuate the expansion and/or contraction of the flow displacement member or a component of the flow displacement member.

The flow displacement member may comprise a magnetic or magnetostrictive material. The flow measurement apparatus may include a magnetic system to actuate the expansion and/or contraction of the flow displacement member. The flow measurement apparatus may comprise a chemical injection system. The Injection of a chemical agent may be configured to expand and contract a suitably reactive polymer flow displacement member.

The physical characteristics of the flow displacement member and meter body substrate material and/or coatings may provide resistance to erosion, corrosion and damage caused by foreign objects which may be present within the fluid flow.

The physical characteristics of the flow displacement member and meter body substrate material and/or coatings, such as surface roughness or grooves may provide for fine-tuning of the functioning of the meter.

The flow displacement member and inner surface of the meter body through bore may comprise a range of sizes and/or shaped profiles. The meter body through bore may have an entrance throat section and/or an exit throat section. The entrance and/or exit throat sections may have an inclined, or tapered profile The stepped profile may comprise a series of steps. The inner diameter of each step of the entrance throat section and/or an exit throat section may have a predetermined diameter which may be different to the inner diameter of the other steps of the throat section.

The flow measurement apparatus may be a pitot tube, venturi, vortex, orifice, ultrasonic, turbine, nozzle, rotameter, calorimetric, electromagnetic, magnetic, Doppler, thermal, coriolis and/or pressure differential flow meter.

Preferably the flow measurement apparatus is a pressure differential flow meter.

The fluid may be oil, gas, steam, water, waste product, a mixture thereof or any other suitable fluid.

The meter body may have connectors such as flanges, unions or threaded connections at each end to secure the fluid flow path to a section of pipe work The flow displacement member may have a first diverging section and secondary converging sections. The interface between diverging and converging sections may form a primary peripheral edge.

The flow displacement member and/or mounting member may be adjustably positioned in the fluid flow path. The flow displacement member may be positioned centrally in the fluid flow path. The flow displacement member may or may not be oriented centrally relative to the longitudinal axis of the meter body through bore. The flow displacement member may or may not be oriented perpendicular to the longitudinal axis of the meter body through bore.

The position and/or orientation of the flow displacement member may be determined and/or set by the position and/or orientation of the mounting member.

Preferably the mounting member is a mounting stem.

The flow displacement member and/or mounting member may be supported by at least one support member. The at least one support member may be attached at first end to the flow displacement member and at second end to the mounting member. The at least one support member may be removably attached at first end to the flow displacement and/or the mounting member and removably attached at second end to an inner surface of the meter body.

The at least one support member may comprise spars or strips. The least one support member may be secured using various methods including welding, chemical adhesive or reversible mechanical fixing such as bolts or screws.

The at least one support member may form an integral part of a one-piece mounting member and flow displacement member construction, such as a strengthening web between the mounting member and flow displacement member.

Preferably the distance between the peripheral edge and the inner diameter of the fluid flow path and meter bore may define a flow area and/or beta ratio.

Preferably the displacement member may be made from a solid material, including metals, polymers and ceramics. The displacement member may be formed as an integral unit. The displacement member may be manufactured using various methods, including from a flat plate which is rolled to form a cone or conical shape.

The mounting member and flow displacement member may be of one-piece construction, manufactured by various methods including casting, injection moulding and 3D printing.

The displacement member may comprise of a plurality of segments or sections. The plurality of segments or sections may form a cone or conical shape when assembled. The plurality of segments or sections may be moveable relative to one another. The plurality of segments or sections may be interlocking and be slidable relative to one another.

The size and/or shape of the flow displacement member may be changed by a mechanical linkage or external intervention to move the plurality of segments or sections relative to each other.

The mounting member may be of cylindrical solid bar or tubular construction and form, up to and above, a ninety degree bend when attached to the fluid displacement member. The mounting member may be of solid bar or tubular construction which describes a single radius or variable curved shape The mounting member or flow displacement member may be configured with a gas and fluid deflector or agitator device upstream of the fluid displacement member. This will enhance gas and fluid mixing, thereby producing more comprehensive and accurate measurements. The deflector or agitator may be an integral part of the mounting member or flow displacement member, or a separate component secured to the mounting member or flow displacement member The mounting member may be configured to incorporate a pitot tube or probe for the measurement of fluid flow velocity.

The mounting member and/or the flow displacement member may comprise ports to provide for intervention and communication from outside to inside the fluid flow path. Gas sampling, pressure, electrical and/or mechanical interactions with the flow displacement may be facilitated.

Preferably the flow measurement apparatus may comprise a control unit to monitor the fluid flow rates.

Preferably seals are provided between the outer surface of the meter body and the inner surface of the through bore of the meter body to prevent fluid egress between the fluid flow path and the outer surface of the meter body.

Surface geometry, flow groove and flow port effects may be accounted for by applying relevant factors to mass flow rate and volume flow rate calculations The flow measurement apparatus may comprise at least one sensor. The at least one sensor may be positioned within, adjacent to, or in the vicinity of, the flow displacement member and/or mounting member. The at least one sensor may be a chemical, gas, acoustic, fibre optics and/or humidity sensor.

Data, including acoustic data obtained via fibre optics and moisture content data, may be processed via software utilising artificial intelligence. The data analysis may be based on pattern recognition, machine learning and proprietary algorithms derived from established and verified fluid (gas) flow theory, from empirical meter flow loop test data and from field applications knowledge. Properties of a fluid, such as flow pattern and density, may be derived for fluids with both low and high Reynolds number values. The Reynolds number is the ratio of the inertial forces and the viscous forces, it may be used to assess if flow is laminar or turbulent.

Particles of a specific material may be distributed uniformly, specifically or randomly through the mounting member and flow displacement member substrate material to provide required sensing characteristics Laminar flow occurs at low Reynolds numbers, where viscous forces are dominant, it is characterised by smooth, constant fluid motion; turbulent flow occurs at high Reynolds numbers and is dominated by inertial forces, which tend to produce chaotic eddies, vortices and other flow instabilities which may reduce the efficiency of a flow process and cause cavitation and erosion of flow equipment, including meters.

The data acquisition, processing methods, and enhanced accuracy of resulting numerical outputs may provide a greater understanding of the fluid characteristics and properties than is achievable with conventional flow meters. Fluid flow rates may be optimised, and/or the meter may be reconfigured accordingly.

The data acquisition, recorded and real-time processing methods, and enhanced accuracy of resulting numerical outputs, may provide a more accurate understanding of the pumped fluid characteristics and properties, than is achievable with conventional flow meters. Fluid flow rates may be optimised, and/or the meter may be physically reconfigured accordingly.

The mounting member and flow displacement member may be designed to vibrate at specific levels such that the energy of the dynamic loading induced by the fluid flow may be converted to electricity via kinetic energy recycling and the piezoelectric effect, to power sensors, batteries and data processing apparatus.

The mounting member and flow displacement member may be designed to have internal cavities e.g. lattice or honeycomb structure, providing desired mass and strength, which vibrate at specific levels such that the energy of the dynamic loading induced by the fluid flow may be converted to electricity via kinetic energy recycling and the piezoelectric effect, to power sensors, batteries and data processing apparatus.

Particles of a specific material such as piezoelectric material may be distributed uniformly, specifically or randomly through the mounting member and/or flow displacement member substrate material to provide required electrical generation characteristics.

According to a second aspect of the invention, there is provided a flow measurement apparatus comprising:
  a meter body comprising a through bore and a fluid flow path;
  a flow displacement member removably mountable within the through bore wherein the size and/or shape of the flow displacement member is adjustable to change the beta ratio value of the meter body.

The flow measurement apparatus may comprise a gas pressure system, hydraulic pressure system, mechanical linkage, external intervention, electronic system and/or magnet system to adjust the size and/or shape of the flow displacement member.

Embodiments of the second aspect of the invention may include one or more features of the first aspect of the invention or its embodiments, or vice versa According to a third aspect of the invention, there is provided a method of installing a flow measurement apparatus comprising providing a flow measurement apparatus comprising:
  a meter body comprising a through bore and a fluid flow path; and
  a flow displacement member removably mountable within the through bore;
  connecting the flow measurement apparatus to production pipework.

Preferably the method comprises installing the flow measurement apparatus in the pipework of production flow stream. The method may comprise closing the production flow stream before installing the flow measurement apparatus.

The method may comprise installing the flow displacement member in the meter body. The method may comprise connecting a mounting member to the meter body. The method may comprise connecting the flow displacement member to the flow displacement member.

The method may comprise aligning the flow displacement member relative to the inner surface of the through bore. The method may comprise securing interlocking pins into grooves on the meter body and the mounting member. The mounting member may be a mounting stem.

The method may comprise calculating a beta ratio value for a desired flow rate measurement and/or flow rate measurement range. The method may comprise adjusting the position of the flow displacement member relative to the inner surface of the through bore to reach the desired beta ratio value.

The method may comprise performing fluid dynamics modelling of the mounting member and flow displacement member, relative to component geometry and material characteristics to produce optimised designs which avoid erosion and vibration and resonance at critical frequencies.

Embodiments of the third aspect of the invention may include one or more features of the first or second aspects of the invention or their embodiments, or vice versa.

According to a fourth aspect of the invention, there is provided a method of configuring a flow measurement apparatus comprising providing a flow measurement apparatus comprising:
- a meter body comprising a through bore and a fluid flow path; and
- a flow displacement member configured to be removably mountable within the through bore; and
- adjusting the position, size and/or shape of the flow displacement member in the fluid flow path.

The method may comprise aligning the flow displacement member relative to the inner surface of the through bore. The method may comprise securing the position of the flow displacement member and the mounting member relative to the meter body by interlocking pins and corresponding grooves.

The method may comprise removably mounting the flow displacement member via the mounting member. The mounting member may be a mounting stem.

Embodiments of the fourth aspect of the invention may include one or more features of the first to third aspects of the invention or their embodiments, or vice versa.

According to a fifth aspect of the invention, there is provided a method of
- operating a flow measurement apparatus comprising
- providing a flow measurement apparatus comprising:
- a meter body comprising a through bore and a fluid flow path; and
- a flow displacement member configured to be removably mountable within the through bore; and
- adjusting the position, size and/or shape of the flow displacement member from a first condition to a second condition; wherein the first condition has a first beta ratio value and the second condition has a second beta ratio.

The method may comprise setting the beta ratio at the first or second condition and measuring the flow rate.

The method may comprise taking a pressure measurement downstream of the flow displacement member. The method may comprise taking a pressure measurement upstream of the flow displacement member. The method may comprise comparing pressure measurements taken upstream and downstream of the flow displacement member.

The flow measurement apparatus may comprise a gas pressure system, hydraulic pressure system, mechanical linkage, external intervention, electronic system and/or magnet system to adjust the position, size and/or shape of the flow displacement member.

The method may comprise removably mounting the flow displacement member via the mounting member. The mounting member may be a mounting stem.

Embodiments of the fifth aspect of the invention may include one or more features of the first to fourth aspects of the invention or their embodiments, or vice versa.

According to a sixth aspect of the invention, there is provided a kit of parts comprising:
- a flow measurement apparatus comprising a meter body; and
- a flow displacement member;
- wherein the flow displacement member is configured to reversibly attach to the meter body.

The kit of parts may comprise a mounting member configured to reversible attach to the flow measurement apparatus and/or the meter body. The mounting member may be a mounting stem.

The mounting member may attach reversibly or irreversibly to the flow displacement member.

Embodiments of the sixth aspect of the invention may include one or more features of the first to fifth aspects of the invention or their embodiments, or vice versa.

According to a seventh aspect of the invention, there is provided a flow measurement apparatus comprising:
- a meter body comprising a through bore and a fluid flow path; and
- a flow displacement member removably mountable within the through bore wherein the flow displacement member comprises a generally conical shape.

The flow measurement apparatus may comprise at least one interlocking locating pin and corresponding grooves.

Preferably the flow displacement member is supported by a mounting member. The flow displacement member may be removably attached to the mounting member. Preferably the mounting stem and/or the flow displacement member is configured to be removeable from the meter body.

The mounting member and flow displacement member may be joined to each other using various methods including reversible mechanical fixings such as bolts or screws, chemical adhesive or welding. The mounting member may be a mounting stem.

A bonded metallic and polymer stem and cone may be produced via 3D printing to achieve desired physical characteristics The profile shape of the supporting mounting member is configured to induce minimal or desired turbulence and pressure drop in the fluid as it passes over the supporting mounting member within the fluid flow path, controlling the mechanical loading of the supporting mounting member.

The at least one interlocking locating pin may be located on the meter body with corresponding grooves on the mounting member. The at least one interlocking locating pin may be located on the mounting stem with corresponding grooves on the meter body. This may facilitate accurate alignment of the mounting member and the connected flow displacement member relative to the inner surface of the through bore or fluid flow path.

The inner surface of the through bore, the mounting stem and/or the flow displacement member may comprise a coating.

The coating may be organic or inorganic and include carbide in a nickel-cobalt matrix, ceramics and polymers. The coating thickness may vary from nanometres to millimetres. The coatings may be applied using various methods including chemical vapour deposition, thermal spraying, slurry-coating and additive laser cladding.

Embodiments of the seventh aspect of the invention may include one or more features of the first to sixth aspects of the invention or their embodiments, or vice versa.

According to an eighth aspect of the invention, there is provided a method of installing a flow displacement member in a flow measurement apparatus comprising providing a meter body comprising a through bore and a fluid flow path; and providing a flow displacement member having a connection formed thereon configured to engage an internal surface of the meter body and mount the flow displacement member in the through bore;

securing the flow displacement member to the meter body.

The method may comprise adjusting the position and/or orientation of the flow displacement member relative to the meter body and/or through bore.

The flow displacement member may be formed integral with a mounting member. The flow displacement member may be reversibly connected to a mounting member. The mounting member may connect the flow displacement member to the meter body.

The connection may be configured to removably connect and/or mount the flow displacement member to the internal surface of the meter body. The connection may be a threaded connection or a snap-fit connection.

The flow displacement member may be formed integral with a mounting member. The flow displacement member and/or mounting member may have threads formed thereon which are configured to threadably engage an internal surface of the meter body and reversibly mount the mounting member and flow displacement member in the through bore.

According to further aspects of the invention, there is provided a flow measurement apparatus and a method of measuring a flow rate substantially as herein described with reference to the appended drawings.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

As discussed in the background to the invention above, it is an object of at least one aspect of the present invention to provide a flow measurement apparatus which is robust, reliable with the capability of a flow displacement member being readily and quickly removed, inspected, reconfigured or replaced and re-assembled. It is also an object of the invention to change the fluid flow area between the flow displacement member and the inner diameter of the through bore.

By adjusting the dimensions of the fluid flow path and therefore the flow area in the through bore different beta ratios may be selected. A specific beta ratio may be reliably set, and accurate flow rate measurement readings may be calculated.

Figure 1:
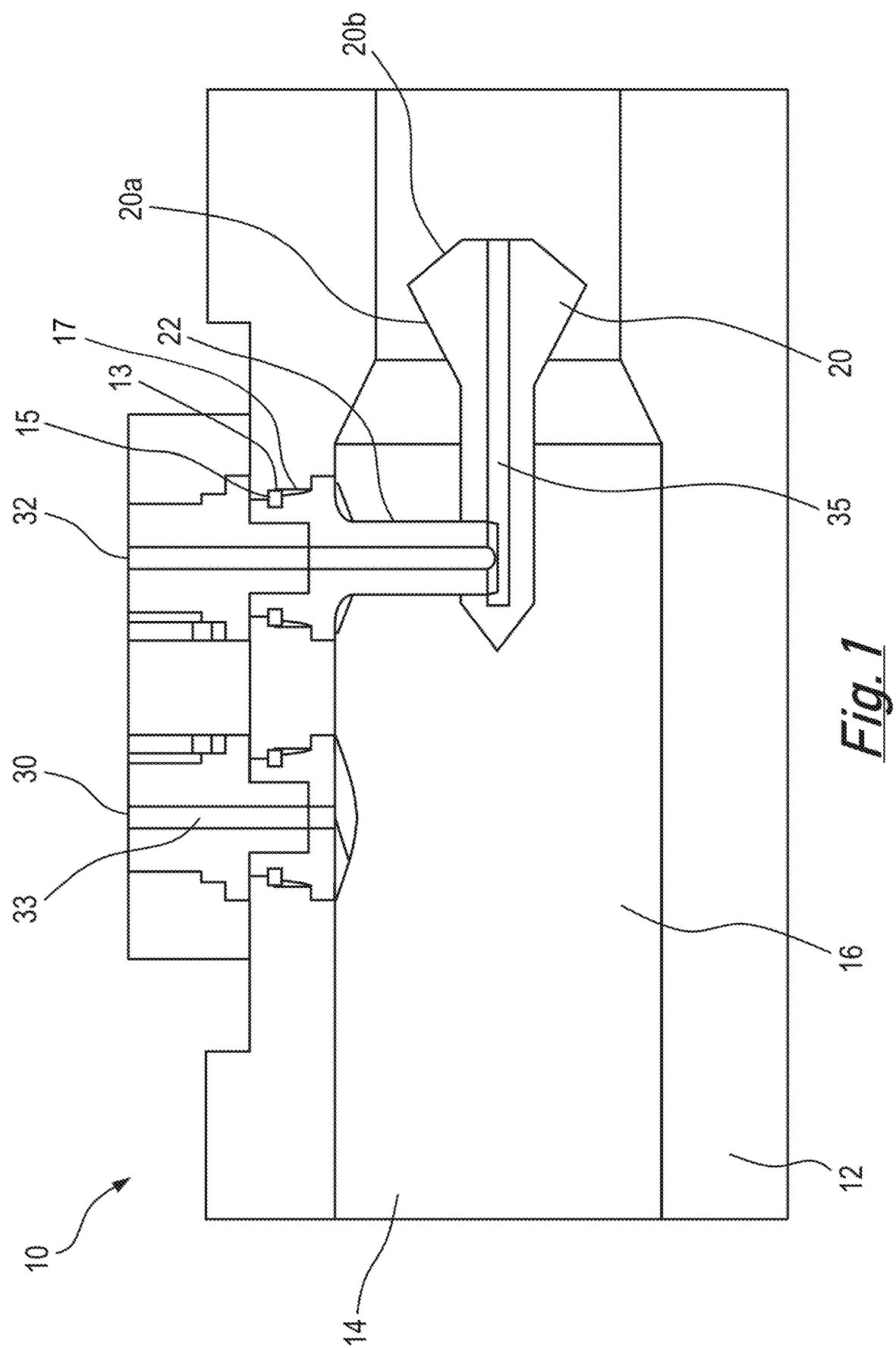
FIG. 1 shows a longitudinal sectional view of a flow measurement apparatus according to a first embodiment of the invention.

FIG. 1 shows a longitudinal sectional schematic view of flow measurement apparatus 10 according to a first embodiment of the invention. The flow measurement apparatus 10 may be seen to comprise a body 12 having a through bore 14 which defines a fluid flow path 16 through which fluid is configured to flow.

The apparatus 10 is configured to be installed in a pipeline structure such that the through bore is aligned and/or in fluid communication with the pipeline. Flanges are located at the ends of the meter body 10. The apparatus is configured to be secured to a pipeline structure (not shown) via bolts or any other affixing manner such as welding if the material is suitable. Seals (not shown) are utilised at the flange sections to prevent leaking or egress of pressure of liquid.

A flow displacement member 20 is disposed in the through bore 14 and suspended in the fluid flow path 16 via a mounting member which in this example is a mounting stem 22. The flow displacement member 20 is removably mounted in the through bore 14 and suspended in the fluid flow path 16. In this example the mounting stem has threads formed thereon which are configured to threadably engage an internal surface of the meter body inside a mounting receptacle 17 within the meter body and mount the mounting stem and flow displacement member 20 in the through bore 14.

The flow displacement member 20 is configured to introduce a pressure difference between the fluid upstream of the flow displacement member 20 and the fluid downstream of the flow displacement member 20.

The profile shape of the supporting mounting stem 22 is configured to induce minimal or desired turbulence and pressure drop in the fluid as it passes over the supporting mounting stem.

The profile shape of the flow displacement member 20 is configured to induce a pressure drop in the fluid as it passes over the flow displacement member 20 in the fluid flow path 16. In this embodiment the displacement member 20 comprises a diverging cone section 20*a* and a converging cone section 20*b*. The geometry or shape of the flow displacement member 20 is selected relative to its position within the fluid flow path. The flow displacement member 20 may have diverging or converging geometry.

The flow measurement apparatus 10 has a first pressure port 30 and a second pressure port 32.

In this example, the shape of the through bore 14 converges at a position downstream of a second pressure port or outlet 32. In alterative apparatus the through bore 14 may converge at different positions relative to the second pressure port or outlet 32. The through bore 14 may be straight and/or diverge along the fluid flow path.

This is one example and alternative shaped displacement members and/or through bores suitable for creating a pressure differential in the fluid may be used.

In the example shown in FIG. 1, the flow displacement member 20 is manufactured from a flat plate, which is rolled and welded to produce a hollow rolled flat plate conical shape having a diverging cone section 20*a* and a converging cone section 20*b*. This rolled plate cone is configured to be less likely to vibrate at critical resonance frequencies during flowing conditions.

Interlocking pins 13 on the mounting stem 22 and grooves 15 on the meter body provide accurate alignment of the flow displacement member 20 relative to the through bore 16 and fluid flow path 16.

The first pressure port 30 is configured to be in fluid communication with the fluid flow path 16 at a position upstream of the flow displacement member 20 via the interior passageway 33 which extends through an upstream pressure port 30

The second pressure port 32 is configured to be in fluid communication with the fluid flow path 16 at a position downstream of the flow displacement member via the interior passageway 35 which extends through the flow displacement member 20 and mounting stem 22.

Figure 2:
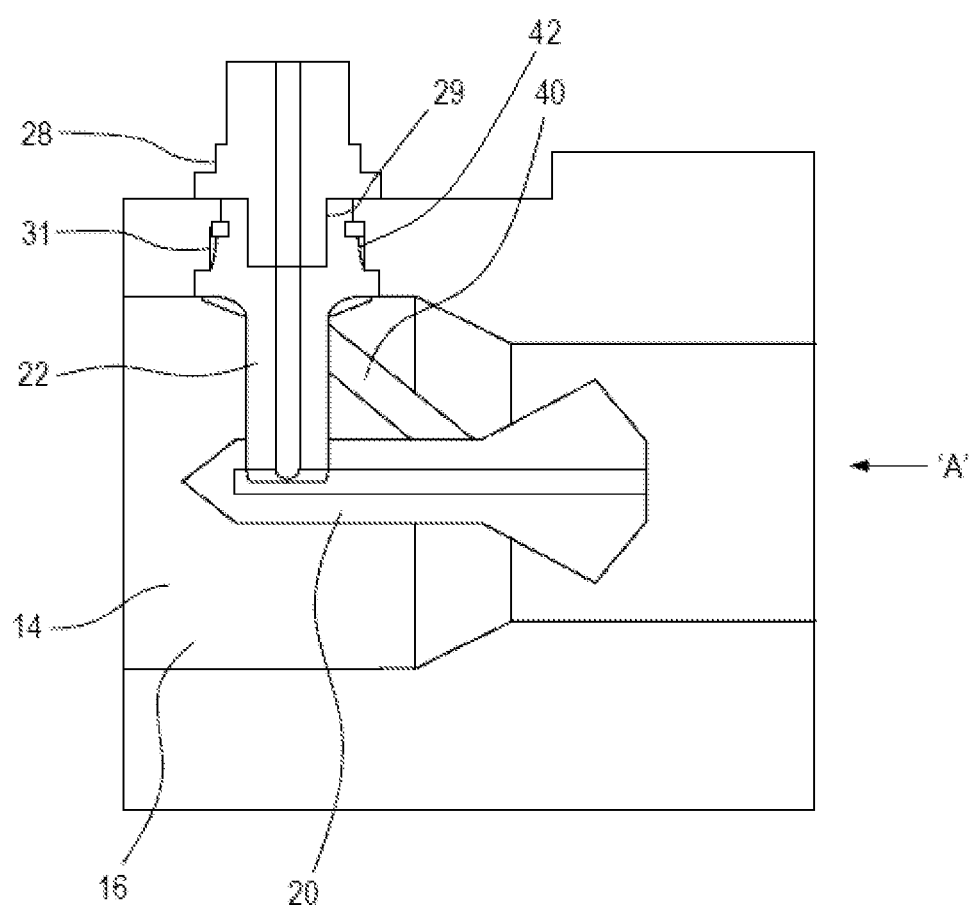
FIG. 2 shows an enlarged view of the flow measurement apparatus of FIG. 1.

FIG. 2 shows an enlarged view of the longitudinal section of FIG. 1. FIG. 2 shows a mounting stem 22 with a mating boss 28. The mating boss 28 has threads 29 which engage with threads in the mounting stem forming a tapered and shouldered connection 31. The tapered portion 31 is configured to permit movement of the mounting stem 22 and flow displacement member 20.

By providing a mounting stem which is capable of moving within the restricted confines of the fluid flow path 16. This facilitates partial rotation and orientation of the combined stem 22 and flow displacement member 20 during assembly and disassembly.

FIG. 2 shows that the flow displacement member may optionally be supported by a support member 40. The support member 40 may incorporate an integral brace or web to reduce vibration of the flow displacement member during fluid flow. The flow measurement apparatus may comprise a vibration isolation mechanism 42. The vibration isolation mechanism may be incorporated into a connection between the mounting member and the meter body.

Figure 3:
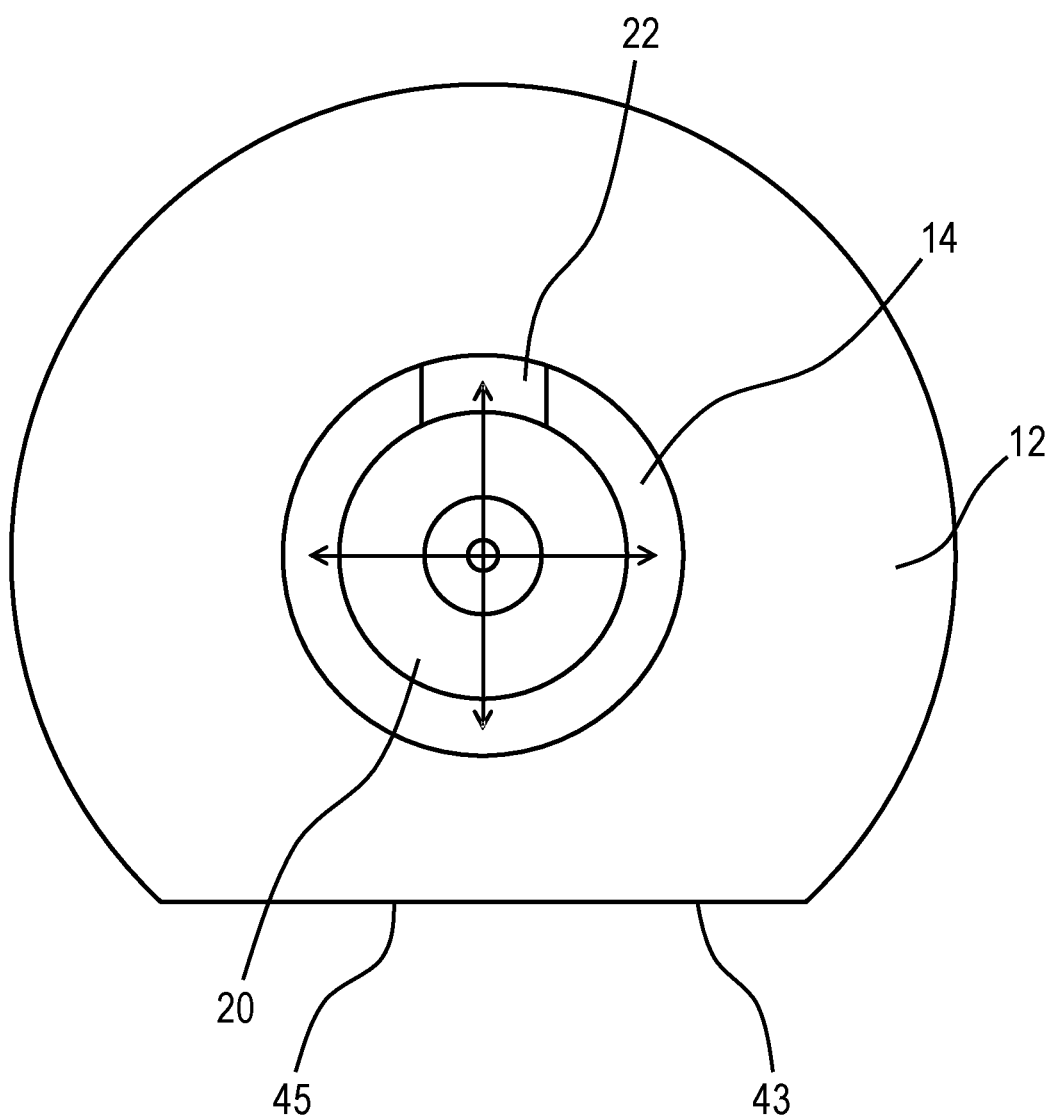
FIG. 3 shows an end view of the flow measurement apparatus of FIG. 1.

FIG. 3 shows an end view of the flow displacement member 20 and meter fluid flow path 16 shown from arrow "A" in FIG. 2. As shown in FIG. 2, the available room in the through bore is restricted. The tapered connection on the meter body and the mounting stem permits orientation of the combined mounting stem and flow displacement member within the restricted confines of the bore of the meter.

The base 43 of the flow measurement apparatus 10 has a generally flat surface 45. The flat surface may facilitate robust mounting of the meter and provide firm support when pipework is connected to each end of the meter.

Figure 4:
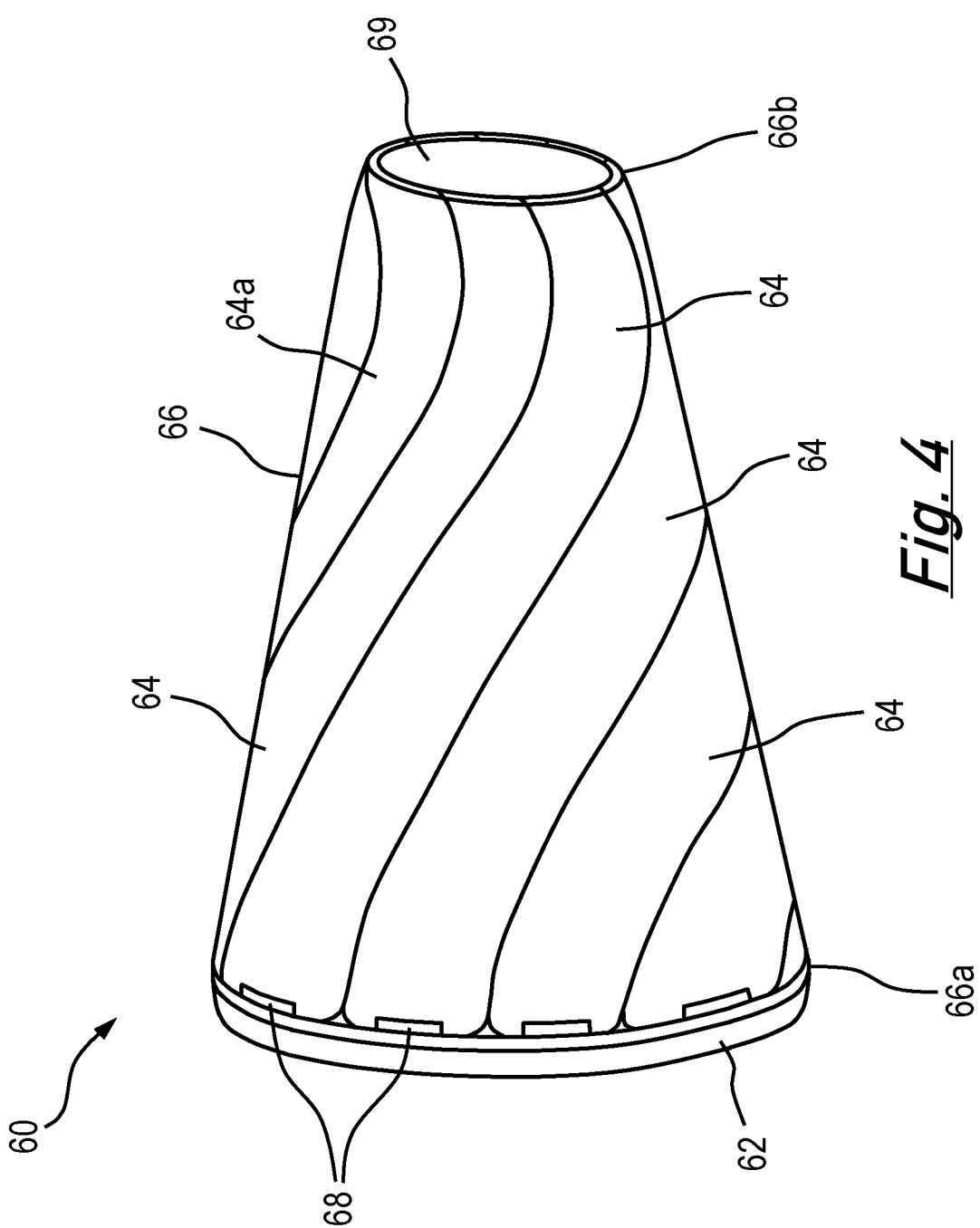
FIG. 4 shows a longitudinal schematic view of a flow displacement member according to another embodiment of the invention.

FIG. 4 shows a side view of a flow displacement member 60 that may be used in the apparatus 10. The flow displacement member 60 has a frame 62 which supports a plurality of segments 64.

In this embodiment the segments interlock and have a helical petal shape. However, it will be appreciated that other segment types and shapes may be used.

The flow displacement member 60 is constructed from interlocking segments 64 located on a guide base or mandrel (not shown). The plurality of interlocking segments 64 assembled together form a conical structure 66 having a first end 66a and a second end 66b. At the first end 66a, the segments 64 are pivotally mounted on the frame 62 by hinges 68.

The outer surface 64a of the assembled segments 64 produce the desired shape and/or profile of the flow displacement member. The shape and/or profile of the flow displacement member 60 is adjustable by moving the interlocking segments relative to one another.

The interlocking segments have corresponding grooves such that adjacent segments are able to move and/or slide relative to each other without separation.

At the second end 66b the segments form an opening 69 which is in fluid communication with the interior passageway 35 which extends through flow displacement member and the mounting stem. The interlocking segments may be mechanically locked in place at a desired shape and/or profile.

Figure 6A:
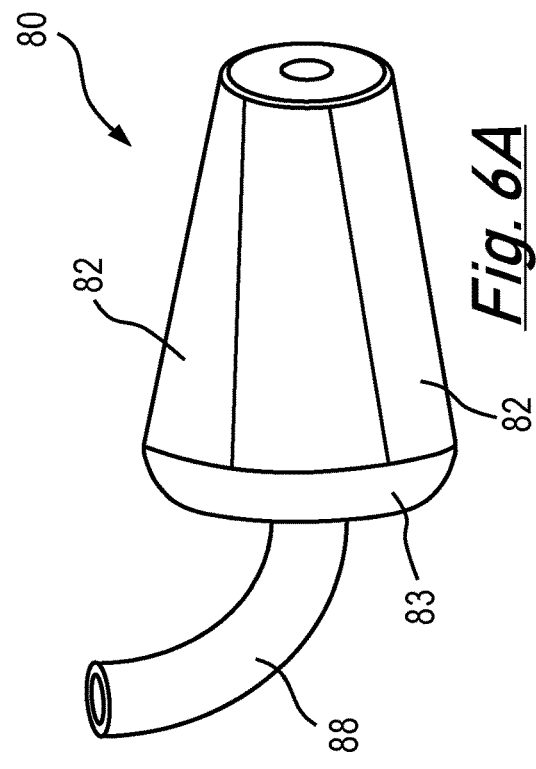
FIGS. 6A and 6B show schematic and sectional views of an adjustable flow displacement member according to another embodiment of the invention.
Figure 6B:
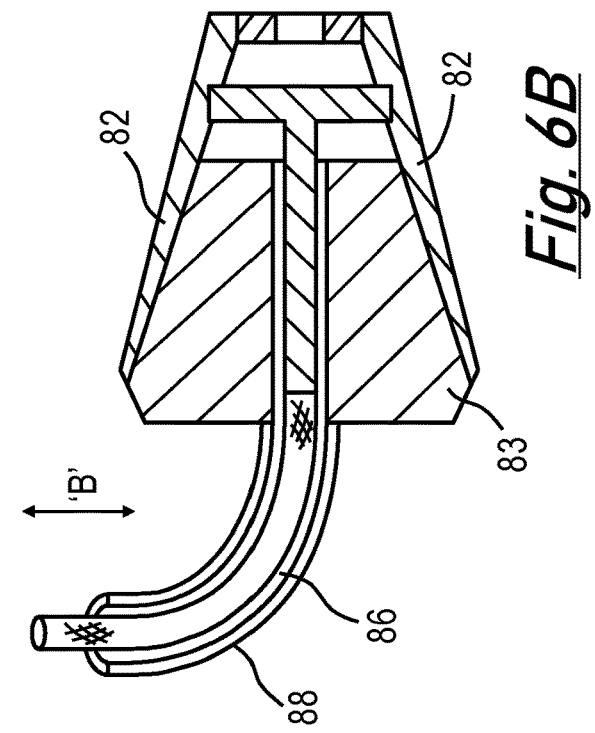
Figure 5A:
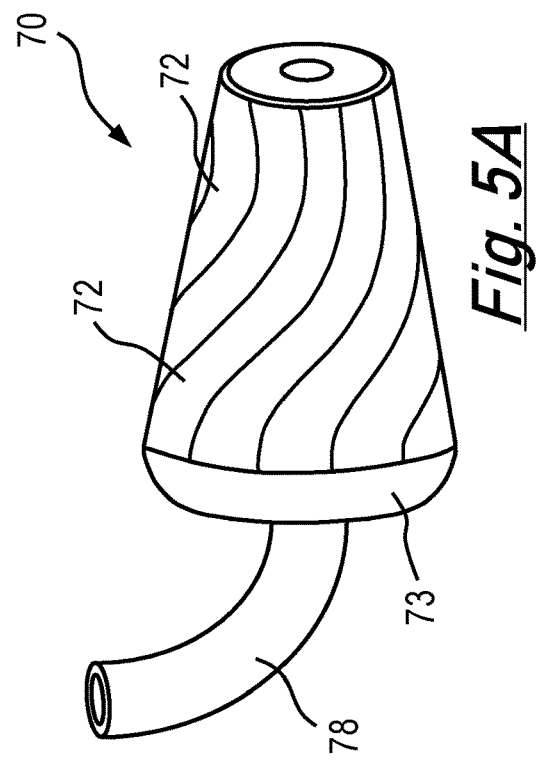
FIGS. 5A and 5B show schematic and sectional views of an adjustable flow displacement member according to an embodiment of the invention.
Figure 5B:
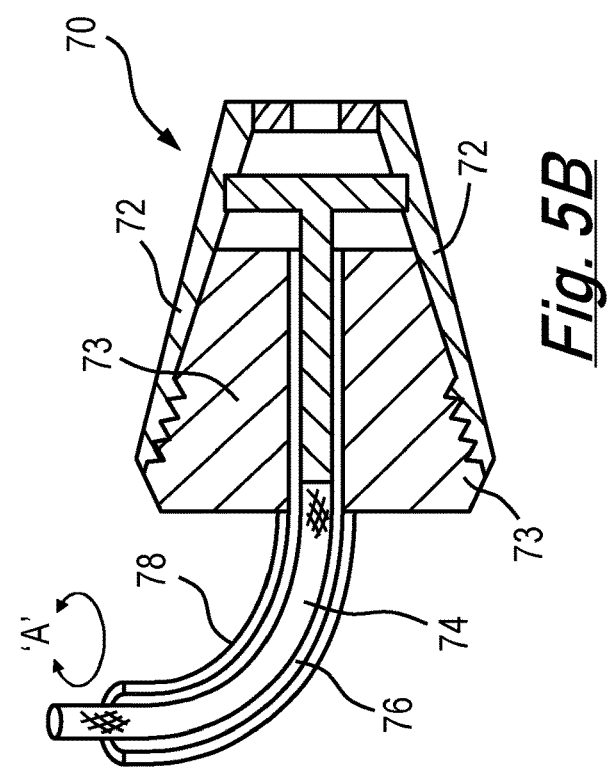

FIGS. 5A and 6A show two types of mechanically adjusted flow displacement members. FIGS. 5B and 6B show sectional views of the flow displacement members of FIGS. 5B and 5B respectively.

FIGS. 5A and 5B show a first type mechanically adjusted flow displacement member. The flow displacement member 70 has a plurality of curved interlocking sections 72 rotational mounted on a circular scrolled mandrel 73.

A flexible drive shaft 74 is located in passageway 76 in the mounting stem 78 and flow displacement member 70.

To adjust the size and/or shape of the flow displacement member rotational force denoted by arrow "A" in FIG. 5B is applied to the flexible drive shaft which results in the rotation and/or axial movement of the segments 72 on the mandrel 73.

FIGS. 6A and 6B show another type of mechanically adjusted flow displacement member. The flow displacement member 80 has a plurality of straight edge interlocking sections 82 slidably mounted on a tapered mandrel 83.

To adjust the size and/or shape of the flow displacement member a compressive force and/or tensile load denoted by arrow "B" in FIG. 6B is applied to the flow displacement member via the passageway 86 within the mounting stem 88 and flow displacement member 80 which results in the sliding of the segments 82 on the mandrel 83.

A combination of rotational force (torque and RPM) and compressive and/or tensile loads may be employed in other designs to adjust the size and/or shape of the flow displacement member.

The flow measurement range of the apparatus depends on the beta ratio value of the apparatus. In order to change the beta ratio value, it may be sufficient to change the size and/or shape of the flow displacement member by a fraction of a millimetre up to two or three millimetres. The range change may be a fraction of a millimetre up to tens of millimetres For meters with cylindrical bores and cylindrical-shaped or conical-shaped flow displacement members, the beta ratio is the ratio of the diameter of the peripheral edge of the flow displacement member and the inner diameter of the through bore.

By knowing the precise value of the beta ratio, the mass flow rate and volume flow rate of fluid, flowing through the meter are calculated thus:

$$\text{Mass Flow Rate } Q_m = X*Cd*E_v*Y*(\beta*D)^2*\sqrt{(\Delta P*\beta_{tp})}$$
and Volume Flow Rate $Q_v=$ $$Q_m/\beta_{tp}$$

Where:
- $Q_m$=mass flow rate at the flowing pressure Pt and flowing temperature $T_f$
- $Q_v$=volume flow rate at the flowing pressure Pt and flowing temperature $T_f$
- X, $X_3$=constant values, determined by the chosen units of measurement.
- Cd=Coefficient of Discharge for that specific meter geometry, measured during calibration $$E_v = 1/\sqrt{(1-\beta^4)}$$

Y=1−(0.649+0.696*$\beta^4$)*ΔP/(k*$P_f$(*$X_3$), for gases, For Liquids, Y=1
β=beta ratio=$\sqrt{(D^2-d^2)}/D$
D=Meter inside diameter at flowing conditions
d=Cone diameter at flowing conditions
ΔP=Differential Pressure across the meter $P_f$=Fluid absolute pressure at the upstream pressure tap.
k=Gas Isentropic Exponent
$\beta_{tp}$=Fluid density at flowing conditions.

Each beta ratio value has a corresponding Coefficient of discharge, which is used along with the measured parameters of Differential Pressure, Flowing Pressure and Temperature to calculate the mass and volume flow rate of the flowing fluid.

Other mechanism types may be used to move and control the expansion, retraction and/or adjustment of size or shape of the flow displacement member including a gas pressure system, hydraulic pressure system, external intervention, electronic system and/or magnet system.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers. Furthermore, relative terms such as ", "downstream", "upstream" and the like are used herein to indicate directions and locations as they apply to the appended drawings and will not be construed as limiting the invention and features thereof to particular arrangements or orientations. Likewise, the term "outlet" shall be construed as being an opening which, dependent on the direction of the movement of fluid may serve as an "entry" or "exit", and vice versa.

The present invention provides a flow measurement apparatus comprising: a meter body comprising a through bore and a fluid flow path; and a flow displacement member removably mountable within the through bore. The flow measurement apparatus of the present invention may improve the accuracy and/or efficiency of flow rate measurement by ensuring that the apparatus is installed correctly and reliably in a precise location and orientation in the through bore flow path.

Components of the flow measurement apparatus including flow displacement member and/or the mounting stem may be removably mountable which allows for the flow measurement apparatus to be readily disassembled, or partially disassembled. The components may also be changeable or replaced. This may facilitate the ease of installation, inspection and condition assessment of internal components and allow assembly and/or reconfiguration.

The ability of the components to be removably mounted allows the components to be accurately installed, replaced, removed and/or configured without welding or permanently affixing the components to the meter body. This mitigates damage to the apparatus during installation into confined space of the meter body or issues with the meter accuracy due to component being warped due to welding heat or being permanently secured in an incorrect orientation or position.

The flow displacement member of the flow measurement apparatus is capable of being physically reconfigured to change the beta ratio such that the flow rate may be accurately measured over a range of flow rates.

The flow measurement apparatus is resistant to the effects of wear, erosion, corrosion and impact damage, caused by chemicals, particulates and foreign objects which may be present within the fluid flow.

Variations to the above-described embodiments are within the scope of this invention, and the invention extends to combinations of features other than those specifically claimed herein.

The invention claimed is:

1. A differential pressure flow measurement apparatus comprising:
   a meter body comprising a through bore and a fluid flow path;
   a flow displacement member;
   a mounting stem configured to support the flow displacement member, the mounting stem including a tapered end with a shoulder that is configured to be removably and securely mountable inside a mounting receptacle formed within the meter body such that the flow displacement member is located within the through bore, wherein the mounting stem has a profile shape configured to induce minimal turbulence in a fluid as it passes over and/or around the mounting stem;
   a first pressure port configured to be in communication with the fluid flow path at a position upstream of the flow displacement member; and
   a second pressure port configured to be in fluid communication with the fluid flow path at a position downstream of the flow displacement member via an interior passageway which extends through the flow displacement member, the mounting stem and the tapered end of the mounting stem;
   wherein the flow displacement member comprises a plurality of interlocking segments, and wherein the plurality of interlocking segments are movable relative to one another to controllably adjust a size and/or shape of the flow displacement member.

2. The flow measurement apparatus according to claim 1 wherein the flow displacement member is removably attachable to the mounting stem.

3. The flow measurement apparatus according to claim 1 wherein the flow displacement member and the mounting stem are an integral unit.

4. The flow measurement apparatus according to claim 1 further comprising at least one locating pin located on the meter body with at least one corresponding groove located on the mounting stem.

5. The flow measurement apparatus according to claim 1, further comprising at least one locating pin located on the tapered end of the mounting stem, wherein the at least one locating pin is configured to be received in at least one corresponding groove located in the mounting receptacle within the meter body.

6. The flow measurement apparatus according to claim 1 wherein the flow measurement apparatus comprises a vibration isolation mechanism located between the mounting stem and the meter body.

7. The flow measurement apparatus according to claim 1 wherein the flow measurement apparatus is configured to be disassembled and the flow displacement member physically reconfigured to change a beta ratio of the meter body.

8. The flow measurement apparatus according to claim 1 wherein a size and/or shape of the flow displacement member is adjustable to change a beta ratio value of the meter body.

9. The flow measurement apparatus according to claim 1 wherein the flow displacement member and/or meter body comprises surface grooves or fluid pathways.

10. The flow measurement apparatus according to claim 9 wherein the surface grooves are formed by mechanical machining, electro-chemical machining, spark erosion, casting and/or 3D printing manufacturing process.

11. The flow measurement apparatus according to claim 1 wherein an inner surface of the through bore, the mounting stem and/or the flow displacement member comprises an organic or inorganic coating.

12. The flow measurement apparatus according to claim 1 further comprising a gas pressure system, hydraulic pressure system, mechanical linkage, external intervention, electronic system and/or magnet system to adjust a size and/or shape of the flow displacement member.

13. The flow measurement apparatus according to claim 1 further comprising a magnetic system to actuate an expansion and/or contraction of the flow displacement member.

14. The flow measurement apparatus according to claim 1 further comprising at least one support member wherein the at least one support member is removably attached at a first end to the flow displacement member and/or the mounting stem and removably attached at a second end to an inner surface of the meter body.

15. The flow measurement apparatus according to claim 1 wherein the plurality of interlocking segments of the flow displacement member form a cone or conical shape.

16. The flow measurement apparatus according to claim 15 wherein a size and/or shape of the flow displacement member is changed by a mechanical linkage or external intervention to move the plurality of interlocking segments relative to each other.

17. The flow measurement apparatus according to claim 1 wherein the mounting stem and/or the flow displacement member comprise at least one port to provide for intervention and communication from outside to inside the fluid flow path.

18. The flow measurement apparatus according to claim 1 wherein the flow measurement apparatus comprises at least one sensor.

19. A method of installing a flow measurement apparatus in a production tubing comprising:
providing a flow measurement apparatus comprising:
a meter body wherein the meter body comprises a through bore and a fluid flow path;
a flow displacement member;
a mounting stem configured to support the flow displacement member, the mounting stem including a tapered end with a shoulder that is configured to be removably and securely mountable inside a mounting receptacle formed within the meter body such that the flow displacement member is located within the through bore, wherein the mounting stem has a profile shape configured to induce minimal turbulence in a fluid as it passes over and/or around the mounting stem;
a first pressure port configured to be in communication with the fluid flow path at a position upstream of the flow displacement member; and
a second pressure port configured to be in fluid communication with the fluid flow path at a position downstream of the flow displacement member via an interior passageway which extends through the flow displacement member, the mounting stem and the tapered end of the mounting stem, wherein the flow displacement member comprises a plurality of interlocking segments, and wherein the plurality of interlocking segments are movable relative to one another to controllably adjust a size and/or shape of the flow displacement member; and
connecting the flow measurement apparatus to the production tubing.

20. The method according to claim 19 comprising closing the production flow stream before installing the flow measurement apparatus.

21. The method according to claim 19 comprising connecting the mounting stem to the meter body.

22. The method according to claim 19 comprising connecting the flow displacement member to the mounting stem.

23. The method according to claim 19 comprising aligning the flow displacement member and/or mounting stem relative to an inner surface of the through bore.

24. A method of operating a flow measurement apparatus comprising:
providing a flow measurement apparatus comprising:
a meter body comprising a through bore and a fluid flow path;
a flow displacement member;
a mounting stem configured to support the flow displacement member, the mounting stem including a tapered end with a shoulder that is configured to be removably and securely mountable inside a mounting receptacle formed within the meter body such that the flow displacement member is located within the through bore, wherein the mounting stem has a profile shape configured to induce minimal turbulence in a fluid as it passes over and/or around the mounting stem;
a first pressure port configured to be in communication with the fluid flow path at a position upstream of the flow displacement member; and
a second pressure port configured to be in fluid communication with the fluid flow path at a position downstream of the flow displacement member via an interior passageway which extends through the flow displacement member, the mounting stem and the tapered end of the mounting stem, wherein the flow displacement member comprises a plurality of interlocking segments, and wherein the plurality of interlocking segments are movable relative to one another to controllably adjust a size and/or shape of the flow displacement member; and
adjusting the position, size and/or shape of the flow displacement member from a first condition to a second condition;
wherein the first condition has a first beta ratio value and the second condition has a second beta ratio value.

25. The method according to claim 24 comprising setting the beta ratio at the first or second condition and measuring the flow rate.

26. The method according to claim 24 comprising measuring a flow rate at the first condition and/or at the second condition.

27. The method according to claim 24, further comprising adjusting a size and/or shape of the flow displacement member in situ.

* * * * *